United States Patent
Lima

(10) Patent No.: US 8,535,787 B1
(45) Date of Patent: Sep. 17, 2013

(54) HEAT SINKS HAVING A THERMAL INTERFACE FOR COOLING ELECTRONIC DEVICES

(75) Inventor: David J. Lima, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 738 days.

(21) Appl. No.: 12/493,829

(22) Filed: Jun. 29, 2009

(51) Int. Cl.
- *B41M 5/00* (2006.01)
- *B44C 1/17* (2006.01)
- *G03C 7/00* (2006.01)
- *B32B 7/12* (2006.01)
- *B32B 15/04* (2006.01)
- *B32B 15/08* (2006.01)
- *F28F 7/00* (2006.01)

(52) U.S. Cl.
USPC .......... 428/195.1; 428/352; 428/458; 165/185

(58) Field of Classification Search
USPC ....... 428/195.1, 200, 343, 352, 458; 165/185
See application file for complete search history.

(56) References Cited

U.S. PATENT DOCUMENTS

| | | | |
|---|---|---|---|
| 4,133,022 A | 1/1979 | Moore et al. | |
| 5,077,638 A | 12/1991 | Andersson et al. | |
| 5,477,416 A | 12/1995 | Schkrohowsky et al. | |
| 5,545,473 A * | 8/1996 | Ameen et al. | 428/212 |
| 5,912,801 A | 6/1999 | Roy et al. | |
| 5,973,923 A | 10/1999 | Jitaru | |
| 6,002,587 A | 12/1999 | Shusa et al. | |
| 6,002,588 A | 12/1999 | Vos et al. | |
| 6,094,349 A | 7/2000 | Fassel et al. | |
| 6,163,454 A | 12/2000 | Strickler | |
| 6,198,630 B1 | 3/2001 | Cromwell | |
| 6,312,287 B1 | 11/2001 | Harting et al. | |
| 6,330,745 B1 | 12/2001 | Cromwell et al. | |
| 6,339,875 B1 * | 1/2002 | Larson | 29/841 |
| 6,372,997 B1 | 4/2002 | Hill et al. | |
| 6,449,150 B1 | 9/2002 | Boone | |
| 6,508,595 B1 | 1/2003 | Chan et al. | |
| 6,545,879 B1 | 4/2003 | Goodwin | |
| 6,600,611 B2 | 7/2003 | Inujima et al. | |
| 6,768,640 B2 | 7/2004 | Doblar et al. | |
| 6,778,386 B2 | 8/2004 | Garnett et al. | |
| 6,816,376 B2 | 11/2004 | Bright et al. | |
| 6,823,915 B2 * | 11/2004 | Schwarzbauer | 156/349 |
| 6,835,453 B2 | 12/2004 | Greenwood et al. | |
| 6,860,649 B2 | 3/2005 | Edwards et al. | |
| 6,893,293 B2 | 5/2005 | Ice et al. | |

(Continued)

OTHER PUBLICATIONS

DuPoint Teijin Films, "Mylar® polyester film, Product Information," 222367D, Jun. 2003, 6 pages.

(Continued)

*Primary Examiner* — Gerard Higgins
*Assistant Examiner* — Sathavaram I Reddy
(74) *Attorney, Agent, or Firm* — Cooley LLP

(57) ABSTRACT

Heat sinks having a thermal interface for cooling electronic devices processing units are described herein. In some embodiments, a thermal interface member includes a first material defining a first layer of the apparatus. The thermal interface member further includes a second material being deformable and thermally conductive, and a third material different from the second material, that is an adhesive material. The second material and the third material collectively define a second layer of the apparatus having a first region and a second region. The first region is formed from the second material. The second region is formed from the third material.

11 Claims, 8 Drawing Sheets

(56) References Cited

U.S. PATENT DOCUMENTS

| | | |
|---|---|---|
| 6,912,131 B2 | 6/2005 | Kabat |
| 6,916,122 B2 | 7/2005 | Branch et al. |
| 6,922,516 B2 | 7/2005 | Kurashima et al. |
| 6,935,882 B2 | 8/2005 | Hanley et al. |
| 6,940,723 B2 | 9/2005 | Ice et al. |
| 6,980,437 B2 | 12/2005 | Bright |
| 6,986,679 B1 | 1/2006 | Aronson et al. |
| 7,048,452 B2 | 5/2006 | Malagrino, Jr. |
| 7,057,895 B2 | 6/2006 | Mejia et al. |
| 7,074,123 B2 | 7/2006 | Bettridge |
| 7,074,490 B2 * | 7/2006 | Feng et al. .............. 428/447 |
| 7,112,131 B2 | 9/2006 | Rasmussen et al. |
| 7,145,773 B2 | 12/2006 | Shearman et al. |
| 7,154,748 B2 | 12/2006 | Yamada |
| 7,164,581 B2 | 1/2007 | Carullo et al. |
| 7,178,996 B2 | 2/2007 | Malagrino |
| 7,195,403 B2 | 3/2007 | Oki et al. |
| 7,209,351 B2 | 4/2007 | Wei |
| 7,224,582 B1 | 5/2007 | Saturley et al. |
| 7,239,515 B2 | 7/2007 | Bulman-Fleming et al. |
| 7,248,479 B2 | 7/2007 | Summers et al. |
| 7,256,995 B2 | 8/2007 | Wrycraft et al. |
| 7,317,617 B2 | 1/2008 | Meadowcroft et al. |
| 7,322,850 B2 | 1/2008 | Neer et al. |
| 7,369,411 B2 | 5/2008 | Hill et al. |
| 7,371,965 B2 | 5/2008 | Ice |
| 7,491,090 B2 | 2/2009 | Oki et al. |
| 7,511,947 B2 | 3/2009 | Leng et al. |
| 7,530,835 B2 | 5/2009 | Yu et al. |
| 7,722,359 B1 | 5/2010 | Frangioso et al. |
| 7,804,684 B1 | 9/2010 | Aybay et al. |
| 7,808,792 B2 | 10/2010 | Nguyen |
| 7,813,120 B2 | 10/2010 | Vinson et al. |
| 7,826,222 B2 | 11/2010 | Aybay et al. |
| 7,885,066 B2 | 2/2011 | Boyden et al. |
| 7,898,808 B2 | 3/2011 | Joiner et al. |
| 7,916,472 B1 | 3/2011 | Aybay et al. |
| 7,974,098 B2 | 7/2011 | Oki et al. |
| 2002/0018339 A1 | 2/2002 | Uzuka et al. |
| 2002/0126449 A1 | 9/2002 | Casebolt |
| 2003/0002824 A1 | 1/2003 | Chan et al. |
| 2003/0141090 A1 | 7/2003 | Kruger et al. |
| 2003/0161108 A1 | 8/2003 | Bright et al. |
| 2003/0169983 A1 | 9/2003 | Branch et al. |
| 2003/0236019 A1 | 12/2003 | Hanley et al. |
| 2004/0001311 A1 | 1/2004 | Doblar et al. |
| 2004/0052998 A1 * | 3/2004 | Freuler et al. ............ 428/40.1 |
| 2004/0101257 A1 | 5/2004 | Kruger et al. |
| 2004/0130868 A1 | 7/2004 | Schwartz et al. |
| 2004/0203289 A1 | 10/2004 | Ice et al. |
| 2004/0264145 A1 | 12/2004 | Miller et al. |
| 2005/0058790 A1 * | 3/2005 | Simon et al. ............ 428/35.7 |
| 2005/0207134 A1 | 9/2005 | Belady et al. |
| 2005/0220425 A1 | 10/2005 | Kropp et al. |
| 2005/0226571 A1 | 10/2005 | Malagrino, Jr. et al. |
| 2005/0281005 A1 | 12/2005 | Carullo et al. |
| 2006/0002084 A1 | 1/2006 | Wei |
| 2006/0126292 A1 | 6/2006 | Pfahnl et al. |
| 2006/0270275 A1 | 11/2006 | Morohashi et al. |
| 2006/0274518 A1 | 12/2006 | Yu et al. |
| 2007/0134003 A1 | 6/2007 | Lee et al. |
| 2007/0223199 A1 | 9/2007 | Fujiya et al. |
| 2008/0031620 A1 | 2/2008 | Hudgins et al. |
| 2008/0232067 A1 | 9/2008 | Joiner et al. |
| 2008/0247762 A1 | 10/2008 | Yoshikawa et al. |
| 2008/0271875 A1 | 11/2008 | Lima |
| 2009/0166854 A1 | 7/2009 | Jewram et al. |
| 2009/0296352 A1 | 12/2009 | Lima |
| 2010/0014248 A1 | 1/2010 | Boyden et al. |
| 2011/0011562 A1 | 1/2011 | Aybay et al. |
| 2011/0011567 A1 | 1/2011 | Aybay et al. |
| 2011/0110048 A1 | 5/2011 | Lima |
| 2011/0182027 A1 | 7/2011 | Lima |

OTHER PUBLICATIONS

The Gund Company, Inc., "Material Data Sheet, Mylar® Polyester Film Type EL-21," not dated, 4 pages.

DuPoint Teijin Films, Datasheet [online], [retrieved on Jun. 19, 2009]. Retrieved from the Internet: <URL: http://www.mylar.com/FilmEnterprise/Datasheet.asp?ID=406&Version=US>, 3 pages.

Chomerics, "THERMFLOW® Thermal Interface Material Application Guide," AN 1002 EN 08/07 Rev A, 5 pages.

Fujipoly—Sarcon Thermal Interface Materials [online], [retrieved on Jun. 18, 2009]. Retrieved from the Internet: <URL: http://www.fujipoly.com/products/genProductLine.asp?ProductLine=Sarcon_Thermal_Interface_Materials>, 3 pages.

Chomerics, "THERMFLOW® T777, Low Thermal Resistance THERMFLOW® Phase Change Pad Polymer Solder Hybrid (PSH) Thermal Interface Material," TB 1027 EN 08/07 Rev A, 2 pages.

David J. Lima, "Thermal Interface Members for Removable Electronic Devices" U.S. Appl. No. 12/616,497, filed Nov. 11, 2009, (36 pgs).

Office Action mailed Dec. 9, 2011 for U.S. Appl. No. 12/616,497 (9 pages).

* cited by examiner

HEAT SINKS HAVING A THERMAL INTERFACE FOR COOLING ELECTRONIC DEVICES

BACKGROUND

This invention relates to apparatus and methods for cooling electronic devices, such as, for example, heat sinks having a thermal interface for cooling electronic devices.

Some known electronic devices are manufactured according to industry standards that specify the size, shape, form factor and/or electronic performance of the electronic device. The use of such standards allows similar electronic devices produced by different manufacturers to be used interchangeably within a data processing unit (e.g., a router, a switch, a server and/or the like). Because the size, shape and/or form factor of such known electronic devices are dictated by such industry standards, in certain instances there can be limited flexibility to change the design of electronic device to improve heat dissipation, increase power levels or the like. Accordingly, some known data processing units include heat sinks and/or other ancillary devices to improve the overall performance of such electronic devices.

For example, some known optical transceivers are manufactured according to an industry standard known as the Small Form-factor Pluggable (SFP) standard. Optical transceivers manufactured according to the SFP standard are configured to be "pluggable" such that the optical transceiver can be inserted and/or removed from the host data processing unit without removing power from the unit. Some such optical transceivers are installed inside of the host data processing unit within a protective cage or enclosure that includes a heat sink to dissipate heat from the optical transceiver. Because such known optical transceivers are configured to be inserted into and/or removed from the host data processing unit, such known heat sinks can be spring-mounted to the cage such that at least a portion of the heat sink is in contact with the optical transceiver after installation.

The interface between such known heat sinks and electronic devices can be compromised, however, by misalignment of the heat sink and/or the electronic device, surface roughness on the mating surfaces and/or the like, thereby reducing the heat transfer between the heat sink and the electronic device. Moreover, contact between the heat sink and the electronic device when the electronic device is being inserted into the cage can result frictional forces that inhibit the insertion into and/or removal of the electronic device from the cage.

Thus, a need exists for improved apparatus and methods for apparatus and methods for cooling electronic devices.

SUMMARY

Heat sinks having a thermal interface for cooling electronic devices processing units are described herein. In some embodiments, a thermal interface member includes a first material defining a first layer of the apparatus. The thermal interface member further includes a second material being deformable and thermally conductive, and a third material different from the second material, that is an adhesive material. The second material and the third material collectively define a second layer of the apparatus having a first region and a second region. The first region is formed from the second material. The second region is formed from the third material.

DETAILED DESCRIPTION

Figure 1:
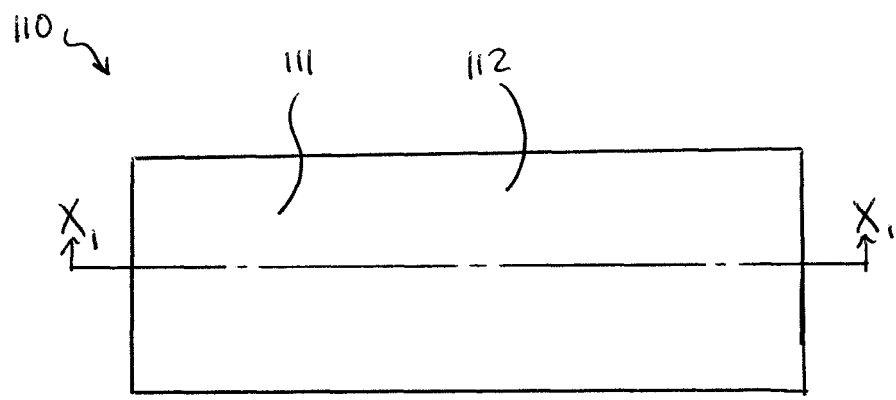
FIG. 1 is a top view schematic illustration of a thermal interface member according to an embodiment.

Heat sinks having a thermal interface for cooling electronic devices processing units are described herein. In some embodiments, a thermal interface member includes a first material, a second material and a third material. The first material defines a first layer of the apparatus, and can be, for example, a material having high tear resistance, high abrasion resistance, high thermal conductivity and/or a low coefficient of friction. The second material is deformable and thermally conductive, and can be, for example, a thermally conductive gel. The third material, which is different from the second material, is an adhesive material, such as a pressure-sensitive adhesive. The second material and the third material collectively define a second layer of the apparatus having a first region and a second region. The first region is formed from the second material. The second region is formed from the third material.

In some embodiments, a data processing unit configured to receive an electronic device includes a heat sink and a thermal interface member. The heat sink, which is configured to be coupled to an enclosure and/or a protective cage, has a contact surface and a tapered surface. The contact surface is configured to contact a first surface of the electronic device when the electronic device is installed within the enclosure. The tapered surface is configured to contact a second surface of the electronic device when the electronic device is moved within the enclosure. In some embodiments, the heat sink can move relative to the electronic device when the second surface of the electronic device contacts the tapered surface of the heat sink. A first portion of the thermal interface member is disposed against the contact surface. The first portion of the thermal interface member is deformable and thermally conductive. The first portion of the thermal interface member can include, for example, a thermally conductive gel. A second portion of the thermal interface member is coupled to the tapered surface.

In some embodiments, a method includes disposing a thermal interface member against a heat sink such that a first portion of the thermal interface member is disposed against a contact surface of the heat sink. The first portion of the thermal interface member is deformable and thermally conductive. A second portion of the thermal interface member is coupled to a tapered surface of the heat sink via an adhesive.

As used herein the term "data processing unit" refers to any computer, electronic switch, switch fabric, portion of a switch fabric, router, host device, data storage device, line card or the like used to process, transmit and/or convey electrical and/or optical signals. A data processing unit can include, for example, a component included within an electronic communications network. In some embodiments, for example, a data processing unit can be a component included within or forming a portion of a core switch fabric of a data center. In other embodiments, a data processing unit can be an access switch located at an edge of a data center, or a host device (e.g., a server) coupled to the access device. For example, an access switch can be located on top of a chassis containing several host devices.

As used herein the term "electronic device" refers to any component within a data processing unit that is configured to perform an electronic function associated with the data processing unit. An electronic device can include, for example, a switching device, a converter, a receiver, a transmitter, a signal conditioner, an amplifier or the like. In some embodiments, an electronic device can include an optical transceiver configured to convert electrical signals into optical signals and vice versa.

Figure 2:
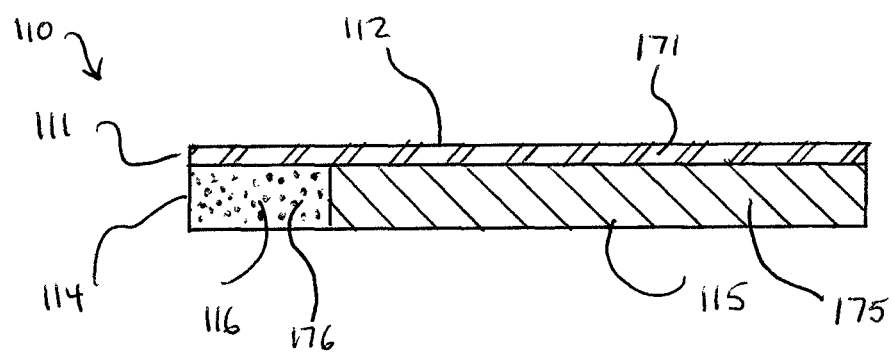
FIG. 2 is a cross-sectional view of the thermal interface member shown in FIG. 1 taken along line $X_1$-$X_1$ in FIG. 1.

FIGS. 1 and 2 are a schematic illustrations of a thermal interface member 110 according to an embodiment. The thermal interface member 110, which is configured to be coupled to a heat sink 130 (see e.g., FIGS. 3 and 4), includes a first material 171, a second material 175 and a third material 176. The first material 171 defines a first layer or stratum 111 of the thermal interface member 110. In some embodiments, for example, the first material 171 can be any suitable material of the types shown and described herein that is tear-resistant, puncture-resistant, abrasion-resistant and/or thermally conductive. In some embodiments, for example, the first material 171 can have a thermal conductivity of at least approximately 0.07 W/m-K and a Graves tear resistance value of at least one pound. In other embodiments, the first material 171 can have an Elmendorf tear strength, which is a measure of the force required to propagate an existing slit a fixed distance to the edge of the a test sample, of at least 0.07 pounds.

Moreover, in some embodiments, an outer surface 112 of the first layer 111 can be configured to be in sliding contact with another structure. For example, in some embodiments, the outer surface 112 of the first layer 111 can have a low coefficient of static friction and/or a low coefficient of kinetic friction to facilitate sliding contact between the thermal interface member 110 and another structure, such as, for example, the electronic device 180 (see e.g. FIGS. 3 and 4). For example, in some embodiments, the outer surface 112 of the first layer 111 can have a static coefficient of friction of less than approximately 0.5. In other embodiments, the outer surface 112 of the first layer 111 can have a static coefficient of less than approximately 0.1. In some embodiments, the first material 171 can have a high lubricity, which can be beneficial when the electronic device 180 is moved relative to the heat sink 130. The lubricity of the outer surface 112 can also improve the tear resistance of the first layer 111 by allowing the outer surface 112 to slide smoothly relative to the heat sink 130.

In some embodiments, the first material 171 and/or the first layer 111 can be flexible. Similarly stated, in some embodiments, the first material 171 and/or the first layer 111 can have a low resistance to deflection, deformation and/or displacement when exposed to an external force. In this manner, the first layer 111 and/or the thermal interface member 110 can be coupled to a portion of the heat sink 130 such that the first layer 111 and/or the thermal interface member 110 substantially conforms to the shape of the portion of the heat sink 130. As described herein, this arrangement allows the thermal interface member 110 to effectively transfer heat between the electronic device 180 and the heat sink 130.

The flexibility of the first layer 111 is an extensive property, and thus is dependent upon the properties of the first material 171 and certain physical characteristics of the first layer 111 (e.g., shape). For example, the flexibility of the first layer 111 can be increased by selecting a first material 171 having a low modulus of elasticity. The modulus of elasticity is an intensive property of the first material 171 and describes a material's tendency to elastically (i.e., non-permanently) deform in response to an applied force. In another example, the flexibility of the first layer 111 can be increased or decreased by changing the flexural modulus of the first material 171. The flexural modulus is used to describe the ratio of the applied stress on an object in flexure to the corresponding strain in the outermost portions of the object. The flexural modulus, rather than the modulus of elasticity, is used to characterize certain materials, for example plastics, that do not have material properties that are substantially linear over a range of conditions. For example, an object having a low flexural modulus is more flexible (i.e., is less elastic and has a greater strain on the outermost portions of the object for a given applied force) than an object having a high flexural modulus. Thus, the flexibility of the first layer 111 can be increased by selecting a first material 171 having a low flexural modulus. In some embodiments the first material 171 can have a modulus of elasticity and/or a flexural modulus of less than approximately 750 ksi. In other embodiments the first material 171 can have a modulus of elasticity and/or a flexural modulus of less than approximately 400 ksi.

The flexibility of the first layer 111 can also be increased or decreased by changing the shape, cross-sectional area and/or thickness of the first layer 111. Although the first layer 111 is shown as being substantially planar and having a substantially constant thickness, in other embodiments, the first layer 111 can have a non-uniform thickness and/or can have an irregular cross-sectional shape (e.g., corrugations or the like) to result in the desired flexibility. Additionally, to increase the flexibility and/or enhance the thermal conduction through the first layer 111, the first layer 111 can be thin. In some embodiments, for example, the first layer 111 can have a thickness of approximately 13 microns (0.0005 inches) or less. In other embodiments, the first layer 111 can have a thickness of approximately 25 microns (0.001 inches) or less.

In some embodiments, the first material 171 can be a metalized polymer, such as a metalized polyester film, a metalized polyimide film, or the like. Such metalized polymers can include, for example, aluminized Mylar®, Kapton® or the like. In other embodiments, the first material 171 can be a reinforced metal foil that includes, for example, a metal foil reinforced with glass fibers, graphite fibers, or the like. Such materials can provide the thermal properties (e.g., thermal conductivity) and the mechanical properties (e.g., toughness, tear resistance, coefficient of friction) desired for the thermal interface member.

Figure 3:
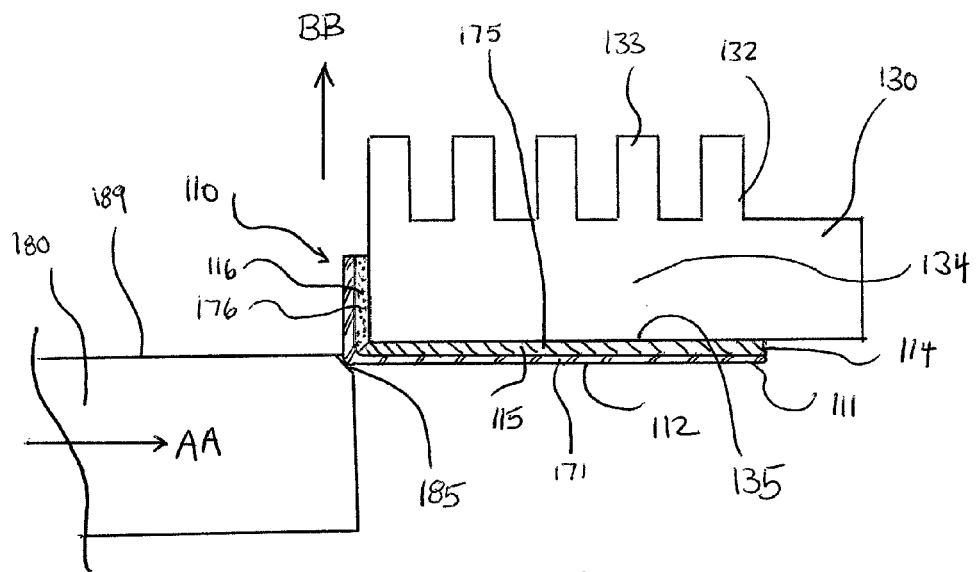
FIGS. 3 and 4 are side view schematic illustrations of a heat sink according to an embodiment including the thermal interface member shown in FIGS. 1 and 2, in a first configuration and second configuration, respectively.
Figure 4:
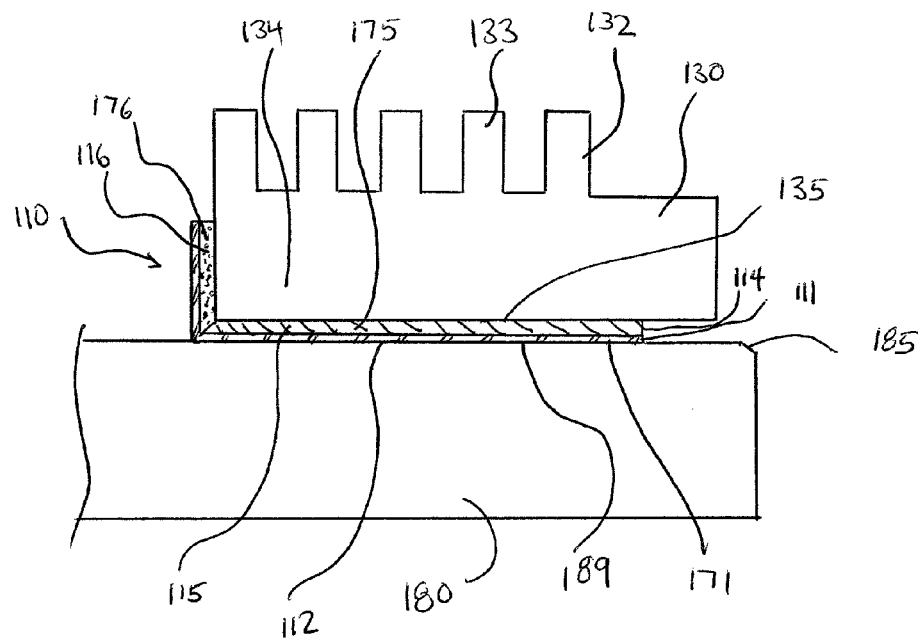

The second material 175 and the third material 176 collectively define a second layer or stratum 114 that includes a first region 115 and a second region 116. The first region 115 is formed from the second material 175, and the second region 116 is formed from the third material 176. The second material 175 is deformable and thermally conductive. Thus, when the second layer 114 is disposed between the contact surface 135 of the heat sink 130 and the first surface 189 of the electronic device 180, as shown in FIGS. 3 and 4, the second material 175 can deform to fill in the crevices, spaces and/or voids between the contact surface 135 of the heat sink 130 and the first surface 189 of the electronic device 180. In this manner, the thermal interface member 110 can enhance the heat transfer between the electronic device 180 and the heat sink 130.

The second material 175 can include, for example, a thermally conductive gel, a thermally conductive grease and/or a phase-change material. For example, in some embodiments, the second material 175 can include a thermally conductive gel having a thermal conductivity of at least 1 W/m-K. In other embodiments, the second material 175 can include a thermally conductive gel having a thermal conductivity of at least 3 W/m-K. In other embodiments, the second material 175 can include a thermally conductive gel having a thermal conductivity of at least 7 W/m-K. Such thermally conductive gels can include silicone-based gels, gels including boron-nitride or the like. For example, in some embodiments the second material 175 can include the SE series of conductive gels produced by Dow Corning.

In some embodiments, the second material 175 can include a phase-change material configured to change phase above a predetermined temperature. Such materials can be formulated to be substantially solid when below a temperature associated with an electronic device (e.g., an operating temperature), and substantially flowable, deformable and/or compressible when above the temperature. This arrangement allows the second material 175 to deform to fill in the crevices, spaces and/or voids between the contact surface 135 of the heat sink 130 and the first surface 189 of the electronic device 180 when the temperature of the material is above the operating temperature of the electronic device 180. In this manner, the thermal interface member 110 can enhance the heat transfer between the electronic device 180 and the heat sink 130. In some embodiments, the second material 175 can be formulated to change phase at a temperature above approximately 40 degrees Celsius. In some embodiments, the second material 175 can include the THERMFLOW® 700 series of phase-change materials produced by Chomerics, a division of Parker Hannifin Corporation. In other embodiments, the second material 175 can include the SARCON® line of thermal interface materials produced by Fujipoly America Corporation.

The third material 176 includes an adhesive suitable for coupling, bonding and/or attaching the thermal interface member 110 to the heat sink 130. In some embodiments, the adhesive can include a mixture and/or combination of materials. In some embodiments, the adhesive can include a pressure-sensitive adhesive. Thus, as discussed below, the thermal interface member 110 can be coupled to the heat sink 130 via the adhesive of the second region 116 of the second layer 114. Moreover, in some embodiments, the first region 115 can be devoid of the third material 176 and/or the adhesive. Similarly stated, in some embodiments, the first region 115 is mutually exclusive from the second region 116. This arrangement allows the primary heat conduction path (i.e., the first region 115 of the second layer 114) to be devoid of adhesives and/or other coupling mechanisms, which could otherwise impede the heat transfer between the electronic component 180 and the heat sink 130.

FIGS. 3 and 4 show the thermal interface member 110 coupled to the heat sink 130. The heat sink 130 includes a convection portion 132 and an engagement portion 134. The convection portion 132 includes a set of protrusions 133 to provide an increased surface area to enhance the transfer of heat between the convection portion 132 and the cooling medium (e.g., air). The engagement portion 134 includes a contact surface 135 configured to contact the first surface 189 of the electronic device 180 (either directly or via the thermal interface member 110, as shown in FIG. 4). In this manner, a conductive heat transfer path can be formed between the heat sink 130 and the electronic device 180.

The electronic device 180, which can be, for example, a pluggable optical transceiver, includes the first surface 189 and an actuation surface 185. The electronic device 180 is configured to be inserted and/or removed from a host data processing unit (not shown in FIGS. 3 and 4). When the electronic device 180 is inserted into the host data processing unit, the first surface 189 of the electronic device 180 is moved into contact with the thermal interface member 110 to form the conductive heat transfer path between the heat sink 130 and the electronic device 180. More particularly, when the electronic device 180 is moved relative to the heat sink 130, as shown by the arrow AA in FIG. 3, the actuation surface 185 of the electronic device 180 contacts the first layer 111 of the thermal interface member 110. Continued movement of the electronic device 180 causes a force to be exerted on the thermal interface member 110 and/or the heat sink 130, resulting in movement of the thermal interface member 110 and the heat sink 130 relative to the electronic device 180 as shown by the arrow BB in FIG. 3. Similarly stated, continued movement of the electronic device 180 causes the actuation surface 185 of the electronic device 180 to move the heat sink 130 away from the electronic device 180.

Additionally, continued movement of the electronic device 180 results in sliding contact between the outer surface 112 of the thermal interface member 110 and the first surface 189 of the electronic device 180. When the electronic device 180 is fully inserted into the host data processing unit, as shown in FIG. 4, the first layer 111 of the thermal interface member 110 remains in contact with the first surface 189 of the electronic device 180, thereby forming a portion of the conductive heat transfer path between the heat sink 130 and the electronic device 180. In some embodiments, the heat sink 130 can be biased against the electronic device 180 by a spring or other suitable mechanism (not shown in FIGS. 3 and 4). Similarly stated, in some embodiments, the heat sink 130 can be urged in a direction opposite the arrow BB by a spring or other suitable mechanism.

As described above, the first (or outer) layer 111 of the thermal interface member 110 can be tear-resistant, puncture-resistant, abrasion-resistant, thermally conductive, lubricious and/or have a low coefficient of friction. In this manner, the risk of ripping, tearing and/or puncturing the first layer 111 of the thermal interface member 110 during installation and/or removal of the electronic device 180 is minimized. Additionally, because of the reduced frictional force between the first layer 111 and the first surface 189 of the electronic device 180, the insertion force (i.e., the force to insert the electronic device 180 into the host data processing unit) can be reduced.

Additionally, when the electronic device 180 is installed in the host data processing unit, the second material 175 of the thermal interface member 110 can deform to fill in the crevices, spaces and/or voids between the contact surface 135 of the heat sink 130 and the first surface 189 of the electronic device 180. In this manner, the thermal interface member 110 can enhance the heat transfer between the electronic device 180 and the heat sink 130. Moreover, because the thermal interface member 110 is coupled to the heat sink 130 via the adhesive third material 176, which is spaced apart from the primary heat conduction path (i.e., the first region 115 of the second layer 114) between the heat sink 130 and the electronic device 180, heat transfer between the electronic device 180 and the heat sink 130 can be further enhanced.

Figure 5:
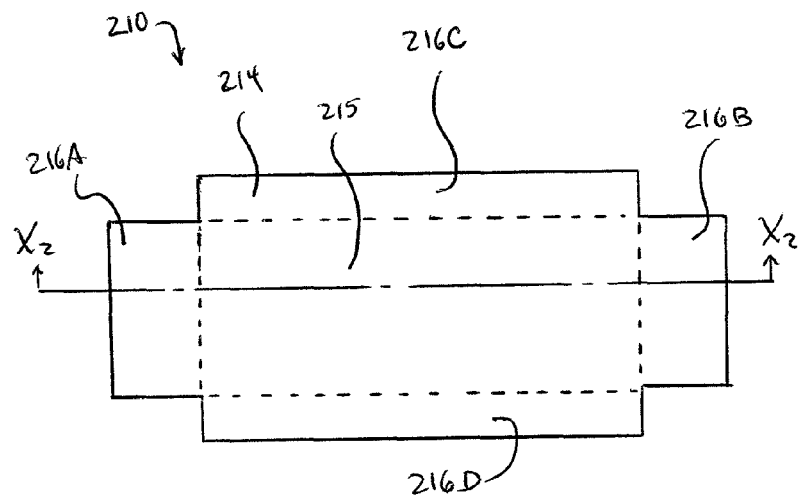
FIG. 5 is a top view of a thermal interface member according to an embodiment.
Figure 6:
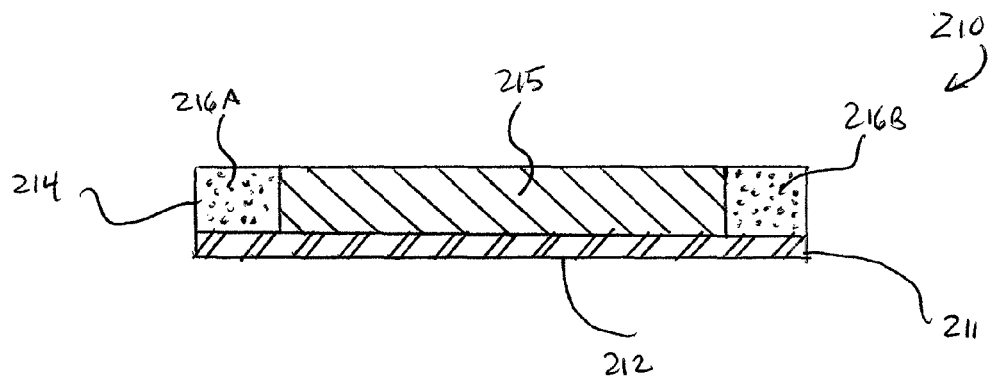
FIG. 6 is a cross-sectional view of the thermal interface member shown in FIG. 5 taken along line $X_2$-$X_2$ in FIG. 5.

Although the thermal interface member 110 is shown as having a second layer with two distinct regions (i.e., region 115 and region 116), in other embodiments, a thermal interface member can include a layer and/or stratum having any number of distinct regions and/or formed from any number of different materials. In such embodiments, each region and/or different material can be configured to be disposed adjacent a particular portion of a heat sink. For example, FIGS. 5 and 6 show a thermal interface member 210 according to an embodiment having one conductive portion 215 and four adhesive portions 216A, 216B, 216C and 216D. The thermal interface member 210, which is configured to be coupled to a heat sink 230 (see e.g., FIG. 7), includes a first layer 211 and a second layer 214. The first layer 211 is formed from a first material, which can be any material of the types shown and described herein that is flexible, tear-resistant, puncture-resistant, abrasion-resistant and/or thermally conductive. Moreover, the outer surface 212 of the first layer 211 is configured to be in sliding contact with the optical transceiver 280 shown in FIGS. 10 and 11. Said another way, the outer surface 212 of the first layer 211 can be lubricious and/or have a low coefficient of friction, as described above with reference to the thermal interface member 110. In some embodiments, for example, the first layer 211 can be a metalized polymer film, such as aluminized Mylar®, having a thickness of approximately 23 microns (0.0005 inches) or less.

Figure 10:
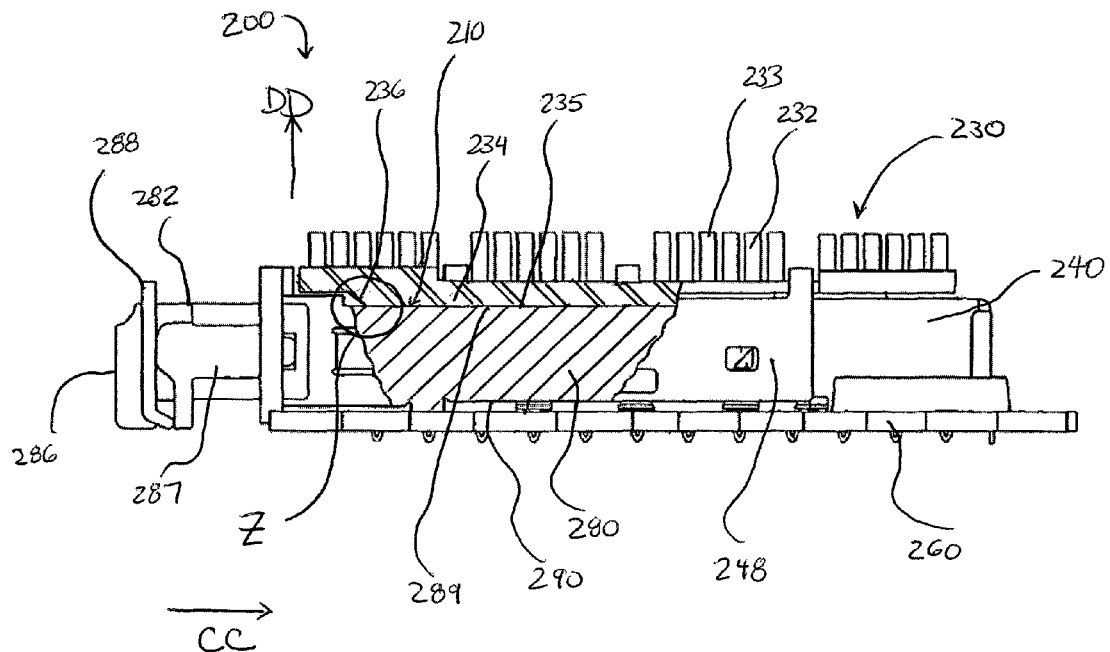
FIG. 10 is a side view and partial cross-sectional view of the optical transceiver assembly shown in FIG. 8.
Figure 11:
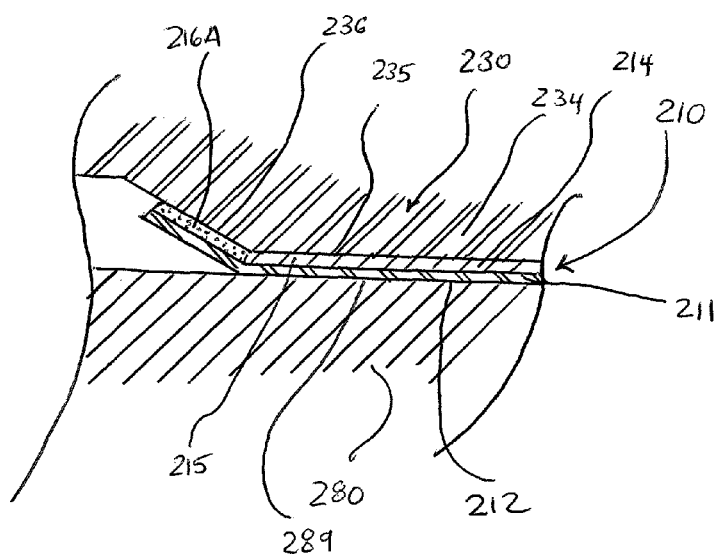
FIG. 11 is a portion of the optical transceiver shown FIG. 10 taken along region Z in FIG. 10.

The second layer 214 includes the conductive region 215 and the four adhesive regions 216A, 216B, 216C and 216D. The conductive region 215 and the four adhesive regions 216A, 216B, 216C and 216D are shown as being separated by dashed lines in FIG. 5, for purposes of clarity. The conductive region 215 is formed from a second material that is deformable and thermally conductive. Thus, when the second layer 214 is disposed between the contact surface 235 of the heat sink 230 and the first surface 289 of the electronic device 280, as shown in FIGS. 10 and 11, the second material can deform to fill in the crevices, spaces and/or voids between the contact surface 235 of the heat sink 230 and the first surface 289 of the electronic device 280. In this manner, the thermal interface member 210 can enhance the heat transfer between the electronic device 280 and the heat sink 230. The second material can include, for example, a thermally conductive gel, a thermally conductive grease and/or a phase-change material of the types described herein.

The adhesive regions 216A, 216B, 216C and 216D of the second layer 214 each include an adhesive. The adhesive can be any suitable adhesive for coupling, bonding and/or attaching the thermal interface member 210 to the heat sink 230. In some embodiments, the adhesive can include a pressure-sensitive adhesive. Thus, as discussed below, the thermal interface member 210 can be coupled to the heat sink 230 via the adhesive of the second region 216 of the second layer 214. In some embodiments, the adhesive included in one of the adhesive regions (e.g., adhesive region 216A) can be different than the adhesive included in another of the adhesive regions (e.g., adhesive region 216C).

In some embodiments, the outer surface 212 of the first layer 211 can include indicia (not shown) associated with the placement and/or the location of the conductive region 215 and the adhesive regions 216A, 216B, 216C and 216D. In some embodiments, for example, the outer surface 212 includes dashed lines indicating the location of the adhesive regions 216A, 216B, 216C and 216D. The dashed lines can be used, for example, as alignment marks to assist a user in coupling the thermal interface member 210 to the heat sink 230 in the desired location and/or orientation. In some embodiments, the outer surface 212 can include instructions for coupling the thermal interface member 210 to the heat sink 230.

Figure 7:
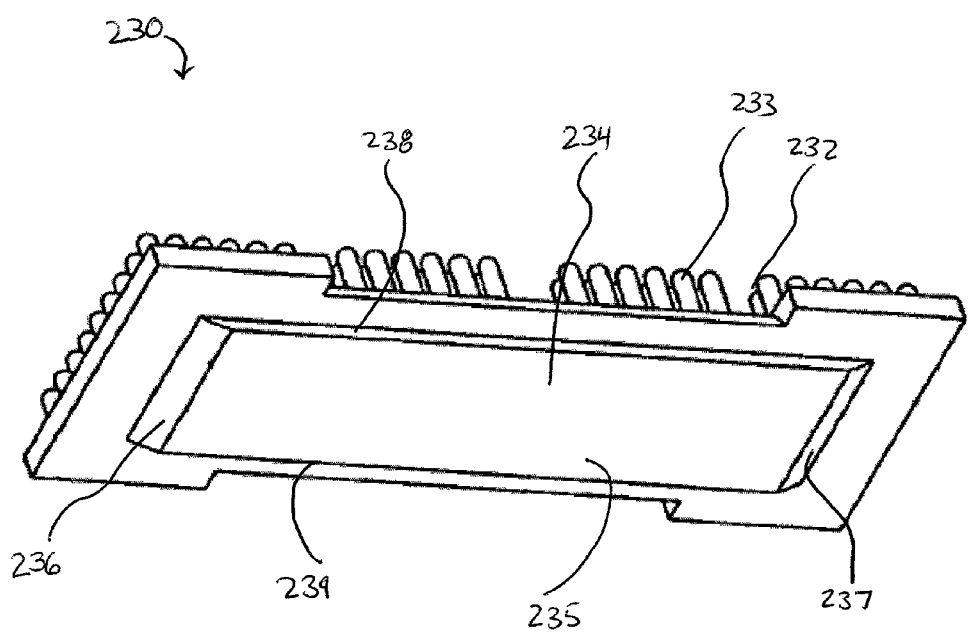
FIG. 7 is a bottom perspective view of a heat sink according to an embodiment, to which the thermal interface member shown in FIGS. 5 and 6 can be coupled.

FIG. 7 shows a heat sink 230 to which the thermal interface 210 can be coupled (the thermal interface 210 is not shown in FIG. 7). The heat sink 230 includes a convection portion 232 and an engagement portion 234. The convection portion 232 includes a series of protrusions 233 to provide an increased surface area to enhance the transfer of heat between the convection portion 232 and the cooling medium (e.g., air). The engagement portion 234 is configured to be disposed within an opening 244 of the mounting cage 240 (see FIG. 8) to contact the optical transceiver 280. More particularly, the engagement portion 234 includes a contact surface 235 configured to contact the first surface 289 of the electronic device 280 (either directly or via the thermal interface member 210, as shown in FIGS. 10 and 11). In this manner, a conductive heat transfer path can be formed between the heat sink 230 and the electronic device 280.

As shown in FIG. 7, the engagement portion 234 of the heat sink 230 also includes a first (or front) tapered surface 236, a second (or rear) tapered surface 237, a first side surface 238 and a second side surface 239. When the thermal interface member 210 is coupled to the heat sink 230, the adhesive region 216A is disposed about and coupled to the first tapered surface 236 and the adhesive region 216B is disposed about and coupled to the second tapered surface 237. Similarly, when the thermal interface member 210 is coupled to the heat sink 230, the adhesive region 216C is disposed about and coupled to the first side surface 238 and the adhesive region 216D is disposed about and coupled to the second side surface 239. In this manner, the conductive region can be positioned and/or disposed about the contact surface 235 of the engagement portion 234. Moreover, the conductive region 215 can be positioned and/or disposed about the contact surface 235 of the engagement portion 234 without any coupling and/or fastening mechanisms (adhesives, screws, welds or the like) within the conductive heat transfer path that includes the contact surface 235 of the heat sink 230 and the conductive region 215 of the thermal interface member 210.

Figure 8:
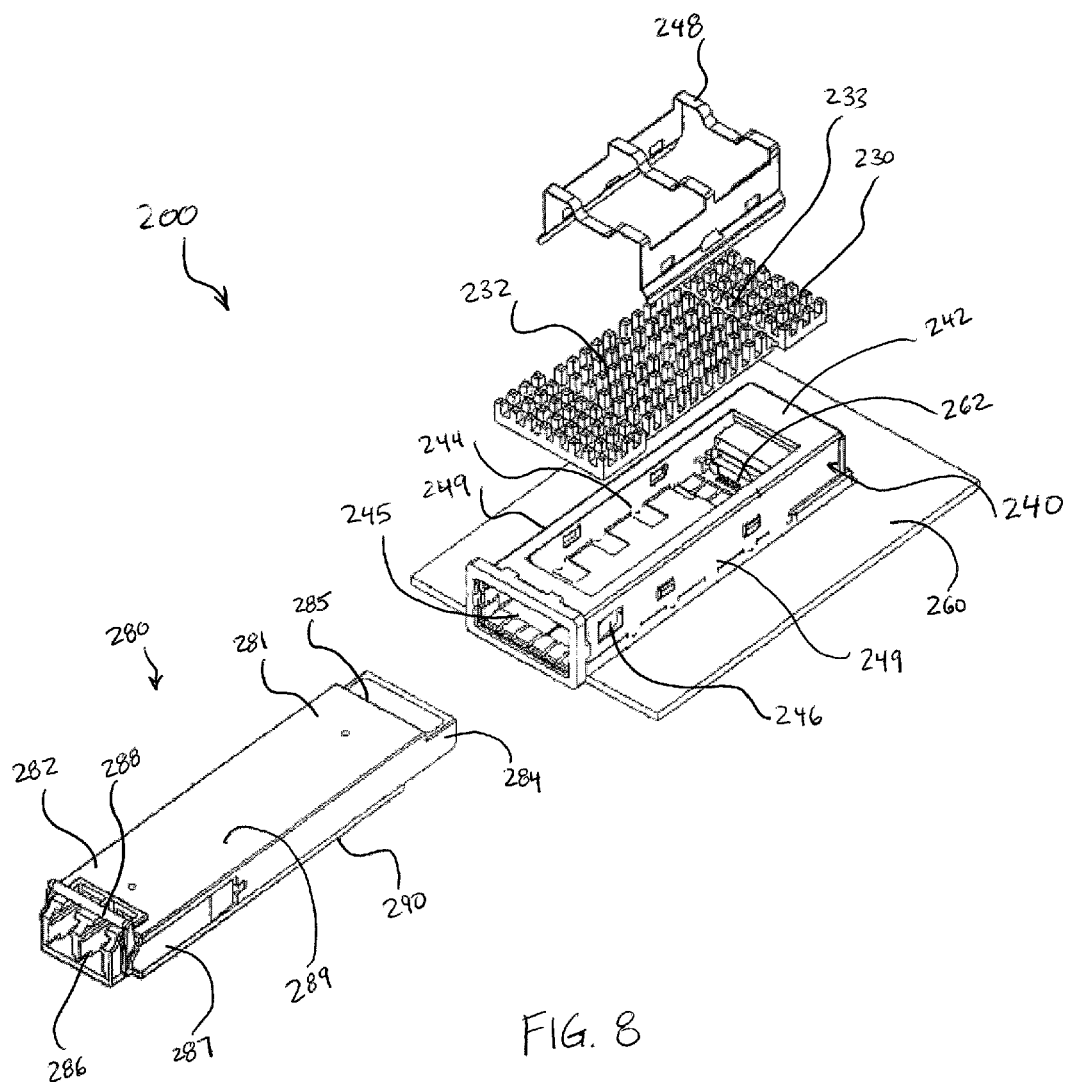
FIG. 8 is an exploded view of an optical transceiver assembly according to an embodiment, that includes the heat sink and thermal interface member, as shown in FIGS. 5-7.
Figure 9:
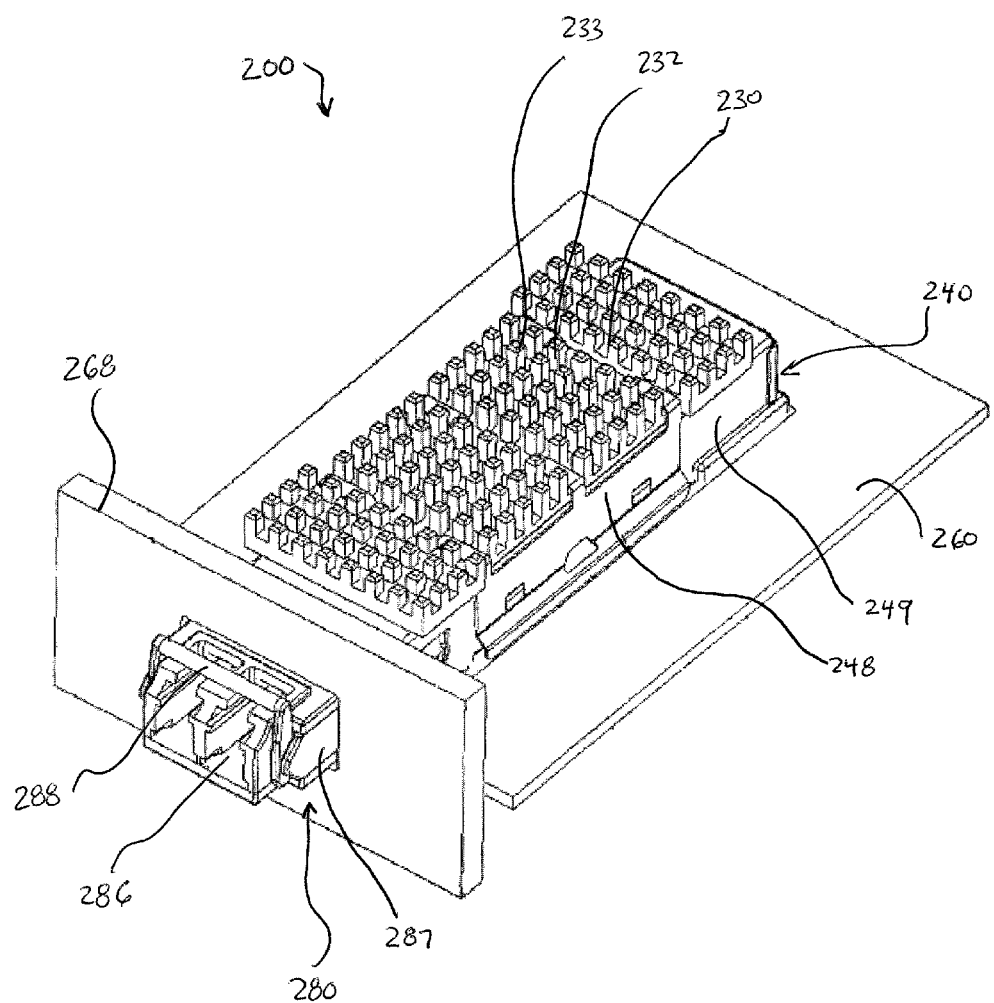
FIG. 9 is a perspective view of the optical transceiver assembly shown in FIG. 8.

The heat sink 230 and the thermal interface member 210 are included within an optical transceiver assembly 200 of a data processing unit, as shown in FIGS. 8-10. The optical transceiver assembly 200 includes a printed circuit board 260, a face plate 268, a mounting cage 240, the optical transceiver 280, a spring 248 and the heat sink 230 (including the thermal interface member 210). The optical transceiver 280 can be any pluggable optical transceiver manufactured according to the SFP standard or any other Multi-Source Agreement (MSA) standard, including, for example, the Quad Small Form factor Pluggable (QSFP) standard, the CXP standard, the XFP standard, or the like. The optical transceiver 280 has a first end portion 281 and a second end portion 282. The first end portion 281, which is configured to be first inserted into the mounting cage 240, includes a connector 284 and an actuation surface or edge 285. The connector is configured to matingly engage the connector 262 of the printed circuit board 260.

The second end portion 282 of the optical transceiver 280 includes an input/output connector 286, a locking mechanism 287 and an actuator 288 configured to actuate the locking mechanism 287. The locking mechanism 287 is configured to matingly engage a corresponding structure in the mounting cage 240 to selectively maintain the optical transceiver 280 within the mounting cage 240. The actuator 288 can actuate and/or release the locking mechanism 287 to facilitate insertion and/or removal of the optical transceiver 280 from the mounting cage 240.

The optical transceiver 280 includes a first (or top) surface 289 and a second (or bottom) surface 290. When the optical transceiver 280 is installed within the mounting cage 240, the first surface 289 is adjacent the opening 244 defined by the mounting cage 240, and the second surface 290 is adjacent and/or in contact with the printed circuit board 260. In this manner, when the optical transceiver 280 is installed within the mounting cage 240 the contact surface 235 of the heat sink 230 can extend through the opening 244 of the mounting cage 240 to contact the first (or top) surface 289 optical transceiver 280.

Referring to FIG. 8, the mounting cage 240 includes a first (or top) side wall 242, a second (or bottom) side wall 243, and two side portions 249. As described above, the first side wall 242 defines the opening 244 within which the contact surface 235 of the heat sink 230 can extend. The mounting cage 240 also defines a front opening 245, through which the optical transceiver 280 is disposed when the optical transceiver 280 is installed into the mounting cage 240. The side portions 249 include locking mechanisms 246 that engage locking mechanism 287 of the optical transceiver 280 to selectively maintain the optical transceiver 280 within the mounting cage 240, as described above.

The spring 248 is coupled to the mounting cage 240 and the heat sink 230 and urges the heat sink 230 downward relative to the mounting cage 240. Similarly stated, the spring 248 biases the heat sink 230 against the mounting cage 240 such that the engagement portion 234 of the heat sink 230 is at least partially disposed within the opening 244 of the mounting cage 240. In this manner, when the optical transceiver 280 is disposed within the mounting cage 240, the force exerted by the spring 248 on the heat sink 240 ensures that the contact surface 235 of the heat sink 230 is in contact with the first surface 289 of the optical transceiver 280. Thus, the heat sink 230 is a dynamically adjustable or "riding" heat sink that can accommodate the insertion and/or removal of the optical transceiver 280.

When the electronic device 280 is moved relative to the heat sink 230 during insertion of the electronic device 280 into the cage 240, as shown by the arrow CC in FIG. 10, the actuation surface or edge 285 of the electronic device 280 initially contacts the first tapered surface 236 of the engagement portion 234 of the heat sink 230. Because the adhesive region 216A is coupled to the first tapered surface 236, the actuation surface or edge 285 of the electronic device 280 contacts the first layer 211 of the thermal interface member 210. Continued movement of the electronic device 280 causes a force to be exerted on the thermal interface member 210 and/or the heat sink 230, resulting movement of the thermal interface member 210 and the heat sink 230 relative to the electronic device 280 as shown by the arrow DD in FIG. 10. Additionally, continued movement of the electronic device 280 results in sliding contact between the outer surface 212 of the thermal interface member 210 and the first surface 289 of the electronic device 280.

As described above, the first (or outer) layer 211 of the thermal interface member 210 can be tear-resistant, puncture-resistant, abrasion-resistant, thermally conductive, lubricious and/or have a low coefficient of friction. In this manner, the risk of ripping, tearing and/or puncturing the first layer 211 of the thermal interface member 210 during installation and/or removal of the electronic device 280 is minimized. Additionally, the reduced frictional force between the first layer 211 and the first surface 289 of the electronic device 280, results in reduced insertion and/or removal force.

When the electronic device 280 is fully inserted into the host data processing unit, as shown in FIGS. 10 and 11, the first layer 211 of the thermal interface member 210 is in contact with the first surface 289 of the electronic device 280, thereby forming a portion of the conductive heat transfer path between the electronic device 280 and the heat sink 230. Additionally, the biasing force exerted by the spring 248 can cause the conduction portion 215 of the thermal interface member 210 to deform to fill in the crevices, spaces and/or voids between the contact surface 235 of the heat sink 230 and the first surface 289 of the electronic device 280. In this manner, the thermal interface member 210 can enhance the heat transfer between the electronic device 280 and the heat sink 230. Moreover, because the thermal interface member 210 is coupled to the heat sink 230 via the adhesive portions 216A, 216B, 216C and 216D, which are spaced apart from the primary heat conduction path between the electronic device 280 and the heat sink 230, heat transfer between the electronic device 280 and the heat sink 230 can be further enhanced.

Figure 12:
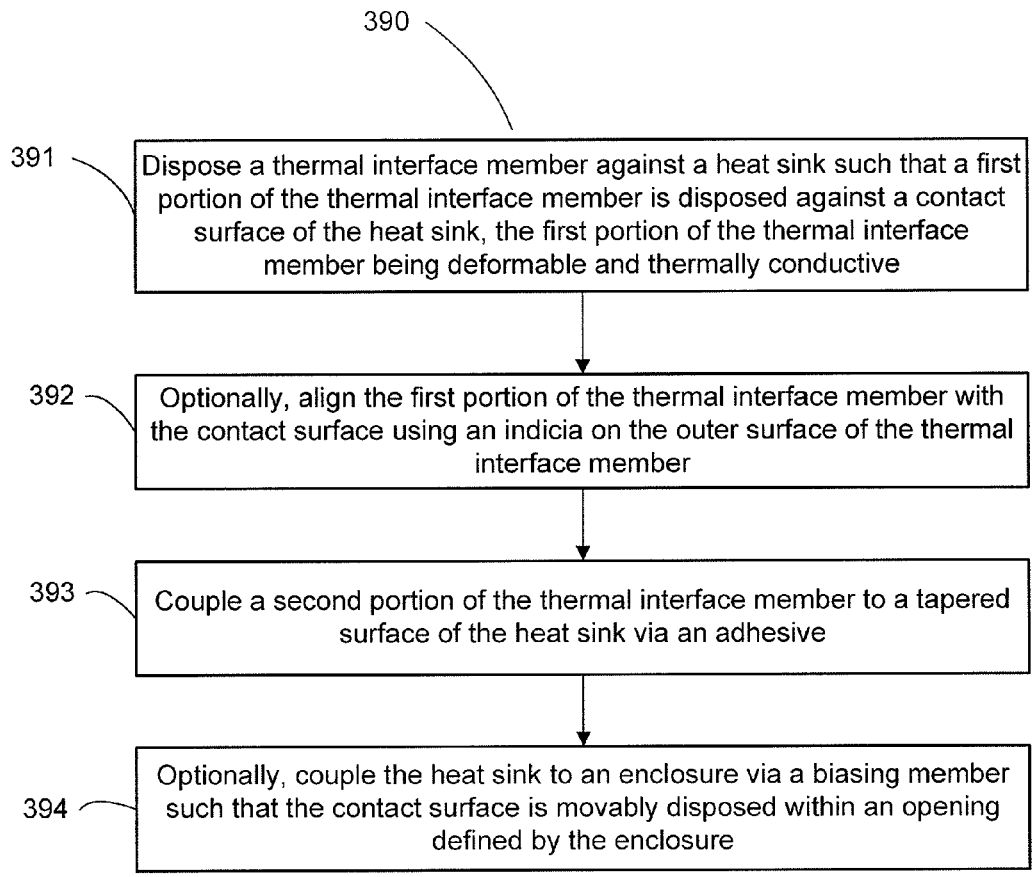
FIG. 12 is a flow chart of a method according to an embodiment.

FIG. 12 is a flow chart of a method 390 according to an embodiment. The method includes disposing a thermal interface member against a heat sink such that a first portion of the thermal interface member is disposed against a contact surface of the heat sink, 391. The first portion of the thermal interface member, which can be any suitable thermal interface member of the types shown and described herein, is deformable and thermally conductive. In some embodiments, for example, the first portion of the thermal interface member can include a thermally conductive gel, a thermally conductive grease and/or a phase-change material.

In some embodiments, an outer surface of the thermal interface member includes an indicia associated with a location of the first portion of the thermal interface member. For example, the indicia can include symbols, dashed lines, arrows or the like indicating the position and/or location of the first portion of the thermal interface member. In such embodiments, the method optionally includes aligning the first portion of the thermal interface member with the contact surface using the indicia, 392.

A second portion of the thermal interface member is coupled to a tapered surface of the heat sink via an adhesive, 393. The adhesive can be a portion of a layer of the thermal interface member, as described herein. In some embodiments, the adhesive can be a pressure-sensitive adhesive. By coupling the thermal interface member to the heat sink via the second portion, the primary heat conduction path, which includes the first portion of the thermal interface member, can be devoid of adhesives and/or other coupling mechanisms. Moreover, in some embodiments, the thermal interface member can include an outer surface, layer and/or stratum that is lubricious and/or has a low coefficient of friction. In such embodiments, coupling the second portion of the thermal interface member to the tapered portion of the heat sink can produce a surface against which an actuation portion of an electronic device can be slidingly disposed.

In some embodiments, the method optionally includes coupling the heat sink to an enclosure via a biasing member such that the contact surface is movably disposed within an opening defined by the enclosure, 394. The enclosure, which can be a protective cage, is configured to receive a pluggable electronic device such that the contact surface of the heat sink is in contact with a surface of the pluggable electronic device when the pluggable electronic device is received within the enclosure.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example. although the thermal interface members are shown and described herein as including two layers, in other embodiments, a thermal interface member can include any number of layers. For example, in some embodiments, a thermal interface member can include a third layer that is disposed about at least a portion an adhesive region and/or a thermally conductive region. The third layer can be removably coupled to the adhesive portions and serve as a removable protective layer to prevent damage to the adhesive region and/or the thermally conductive region.

Although the first region 115 of the thermal interface member 110 is shown as being mutually exclusive and/or distinct from the second region 116, in other embodiments, a first region and the second region of a thermal interface member can overlap and/or share a common portion. Although the first region 115 and the second region 116 are shown as being contiguous and/or sharing, at least in part, a common boundary, in other embodiments, a first region and the second region of a thermal interface member can be non-contiguous.

Although the thermal interface members are shown and described above as having mutually exclusive layers, in other embodiments, a thermal interface member can include multiple different materials that are not separated in discrete layers and or strata.

Although the optical transceivers are described herein as being manufactured according to the SFP standard, in other embodiments, an optical transceiver assembly can include any optical transceiver manufactured according to any Multi-Source Agreement (MSA) standard, including, for example, the Quad Small Form factor Pluggable (QSFP) standard, the CXP standard, the XFP standard, or the like. In yet other embodiments, an optical transceiver assembly can include any optical transceiver, even if not manufactured according to an industry standard.

Although various embodiments have been described as having particular features and/or combinations of components, other embodiments are possible having a combination of any features and/or components from any of embodiments as discussed above.

What is claimed is:

1. An apparatus, comprising:
a first material defining a first layer of the apparatus, the first material being any one of an aluminized polyester film or an aluminized polyimide film;
a second material being deformable and thermally conductive, the second material being at least one of a thermally conductive gel, a thermally conductive grease or a phase-change material configured to change phase at an operating temperature above approximately 40 degrees Celsius; and
a third material different from the second material, the third material being an adhesive material,
the second material and the third material collectively defining a second layer of the apparatus having a first region and a second region, the first region formed from the second material, the second region formed from the third material.

2. The apparatus of claim 1, wherein the first layer is characterized by at least one of an Elmendorf tear strength of at least 0.07 pounds or a Graves tear resistance value of at least one pound.

3. The apparatus of claim 1 wherein the first material is tear-resistant and thermally conductive.

4. The apparatus of claim 1, wherein the first material is characterized by a thermal conductivity of at least approximately 0.07 W/m-K and a Graves tear resistance value of at least one pound.

5. The apparatus of claim 1, wherein the first region is mutually exclusive from the second region.

6. The apparatus of claim 1, further comprising:
a fourth material defining a third layer, the second layer being disposed between the first layer and the third layer, the third layer removably coupled to the second layer.

7. The apparatus of claim 1, wherein a surface of the first layer includes an indicia associated with a location of the first region of the second layer.

8. The apparatus of claim 1, further comprising:
a heat sink having a contact surface configured to contact a surface of a pluggable electronic device, the second layer coupled to the heat sink via the adhesive material such that the first region of the second layer is in contact with the contact surface.

9. The apparatus of claim 8, wherein:
the heat sink has a tapered surface, the adhesive material coupled to the tapered surface.

10. The apparatus of claim 1, wherein an outer surface of the first layer has a static coefficient of friction less than approximately 0.5.

11. The apparatus of claim 1, wherein:
an outer surface of the first layer is formulated to be in sliding contact with a pluggable electronic device.

* * * * *